(12) United States Patent
Huang

(10) Patent No.: US 10,146,061 B2
(45) Date of Patent: Dec. 4, 2018

(54) DOUBLE-RING LENS FILTER HOLDER

(71) Applicant: Microview Technology Corp., Taoyuan (TW)

(72) Inventor: Tzu-Shang Huang, Taoyuan (TW)

(73) Assignee: Microview Technology Corp. (TW)

(*) Notice: Subject to any disclaimer, the term of this patent is extended or adjusted under 35 U.S.C. 154(b) by 72 days.

(21) Appl. No.: 15/436,008

(22) Filed: Feb. 17, 2017

(65) Prior Publication Data

US 2018/0164600 A1    Jun. 14, 2018

(30) Foreign Application Priority Data

Dec. 8, 2016  (TW) ............................ 105140603 A

(51) Int. Cl.
    *G02B 5/30* (2006.01)
    *G02B 27/28* (2006.01)
    *G02B 7/00* (2006.01)
    *G03B 11/00* (2006.01)

(52) U.S. Cl.
    CPC ........... *G02B 27/281* (2013.01); *G02B 7/006* (2013.01); *G03B 11/00* (2013.01)

(58) Field of Classification Search
    CPC .......... G02B 7/00; G02B 7/003; G02B 7/004; G02B 7/005; G02B 7/006; G02B 7/02; G02B 7/021; G02B 7/022; G02B 7/023; G02B 7/025; G02B 7/026
    USPC ...... 359/488.01, 489.2, 490.01, 490.02, 819, 359/821, 822, 823, 824, 825, 8, 26, 827, 359/828, 829, 830; 369/439, 529, 530, 369/531, 533, 544
    See application file for complete search history.

(56) References Cited

U.S. PATENT DOCUMENTS

| | | | | |
|---|---|---|---|---|
| 2,263,684 A | * | 11/1941 | Ryan | F21V 9/14 362/19 |
| 2,298,059 A | * | 10/1942 | Land | G02B 5/3033 359/487.02 |
| 8,976,465 B2 | * | 3/2015 | Meng | G02B 5/20 359/738 |
| 9,933,590 B2 | * | 4/2018 | Kobayashi | G02B 7/006 |
| 9,983,379 B2 | * | 5/2018 | Yuan | G02B 7/006 |
| 2018/0052332 A1 | * | 2/2018 | Meng | G03B 17/565 |

* cited by examiner

*Primary Examiner* — Arnel C Lavarias
(74) *Attorney, Agent, or Firm* — Lerner, David, Littenberg, Krumholz & Mentlik, LLP

(57) ABSTRACT

A double-ring lens filter holder includes a limiting ring, a lock ring, a fixed filter, an adjusting ring, a rotary filter, a compression ring, and at least one guide rod. Each guide rod is mounted through a respective curved recess which is formed through the limiting ring, and each guide rod is mounted securely on the rotary filter. When the fixed filter and the rotary filter are both polarizing filters, in addition to moving the guide rod to adjust the polarizing and darkening effects, the curved recess can also limit the rotating angle of the guide rod to eliminate the cross pattern. Besides, the protruding guide rod allows the users to accurately find the position at which the rotary filter can be rotated.

9 Claims, 5 Drawing Sheets

DOUBLE-RING LENS FILTER HOLDER

CROSS-REFERENCE TO RELATED APPLICATIONS

The present application claims priority from Taiwan Patent Application No. 105140603 filed on Dec. 8, 2016, the disclosure of which is hereby incorporated herein by reference.

BACKGROUND OF THE INVENTION

1. Field of the Invention

The present invention relates to a lens filter holder, especially to a double-ring lens filter holder that can conveniently adjust the filtering effect.

2. Description of the Prior Arts

A filter is an auxiliary photography device mounted in front of a lens, which, in addition to lens protection, selectively absorbs light at different wavelengths to add special effects to images of photography works. Polarizing filters and neutral density filters are the two types of filters that are commonly used.

The polarizing filter is mainly designed to exclusively allow light from particular optical axes to pass through the filter, which turns the unpolarized natural light into polarized light. As a result, the polarizing filter eliminates the reflected light from places such as the surface of non-metallic objects or the water surface to brighten the color of the images.

The neutral density filter, which is capable of reducing the shutter speed by reducing the amount of light passing through the filter, allows the users to produce photos with shallow depth of field even in the strong light condition.

To produce the effect of image requiring combination of multiple lens filters, the users have to carry multiple conventional lens filter holders because each one of the conventional lens filter holders is only equipped with one lens filter. In addition, though the users can produce the effect of light they want by combining multiple lens filters, the view angle will be limited due to the overlapping of the multiple lens filters. For that reason, a conventional lens filter holder with double lens filters is invented.

The conventional holder with double lens filters has one of its two filters fixed and the other filter rotatable. For example, when the two filters are both polarizing filters, the amount of light that can pass through the filters is the maximal when the optical axes of the filters are parallel to each other, producing the lightest polarizing effect. On the other hand, when the two optical axes are perpendicular to each other, the amount of light that can pass through the filter is the minimal and leads to the darkest polarizing effect.

This is to say, the double lens filters holder can reduce the light, in addition to filtering the reflection and brightening the colors. Meanwhile, the range of effective adjustment of the rotary filter is from 0 to 90 degrees, i.e. from the position at which the two axes are parallel to each other to the position at which the two axes are perpendicular to each other.

However, there will be a cross-shaped dark area when the relative angle between the two optical axes is 0 degree or 90 degrees, which is the so-called "cross pattern". To avoid the cross pattern from appearing, the users need to rotate the rotary filter cautiously because there's no constraint to the rotation angle of the rotary filter in the conventional holders, which means that there's no way to know when and where the cross pattern will appear.

Furthermore, the two filters are clamped between several frames and the width of those frames are quite small, making it hard for users to explicitly find, by manual operation, the correct frame which is capable of controlling and rotating the rotary filter.

To overcome the shortcomings, the present invention provides a double-ring lens filter holder to mitigate or obviate the aforementioned problems.

SUMMARY OF THE INVENTION

The main objective of the present invention is to provide a double-ring lens filter holder that limits the rotation angle of the rotary filter to prevent occurrence of the cross pattern.

The double-ring lens filter holder includes a limiting ring, a lock ring, a fixed filter, an adjusting ring, a rotary filter, at least one guide rod, and a compression ring. The limiting ring has an inner ring portion, a connection ring portion, a sleeve ring portion, and at least one curved recess. The inner ring portion extends radially. The connection ring portion axially extends from an inner periphery of the inner ring portion to a rear side of the limiting ring. The sleeve ring portion extends axially from an outer periphery of the inner ring portion to a front side of the limiting ring. The at least one curved recess is formed through the sleeve ring portion and annularly extends around a center of the sleeve ring portion. The lock ring is mounted around the inner ring portion and the connection ring portion, and engages with the limiting ring. The fixed filter is mounted within a space that is surrounded by the inner periphery of the inner ring portion of the limiting ring, and the fixed filter is mounted securely on the inner periphery of the inner ring portion. The adjusting ring is mounted rotatably within a space that is surrounded by the sleeve ring portion of the limiting ring, and the adjusting ring has an inner ring surface facing the inner ring portion of the limiting ring. The rotary filter is mounted between the adjusting ring and the inner ring portion of the limiting ring and mounted securely on the inner ring surface of the adjusting ring. The at least one guide rod is mounted through the at least one curved recess and mounted securely on the adjusting ring. The compression ring is mounted within the space that is surrounded by the sleeve ring portion of the limiting ring and detachably engages with the sleeve ring portion. The adjusting ring and the rotary filter are clamped and limited between the compression ring and the inner ring portion of the limiting portion.

Given the foregoing structure of the double-ring lens filter holder, when the fixed filter and the rotary filter are both polarizing filters, in addition to moving the guide rod to adjust the polarizing and darkening effects, by limiting a radian of the at least one curved recess within the range where the cross pattern does not occur, the at least one curved recess can therefore limit the rotating angle of the guide rod, preventing the users from rotating the rotary filter through the guide rod to the position that causes the cross pattern to occur. Meanwhile, the protruding guide rod allows the users to accurately find the correct position to rotate the rotary filter, which makes the double-ring lens filter holder convenient to use and operate.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
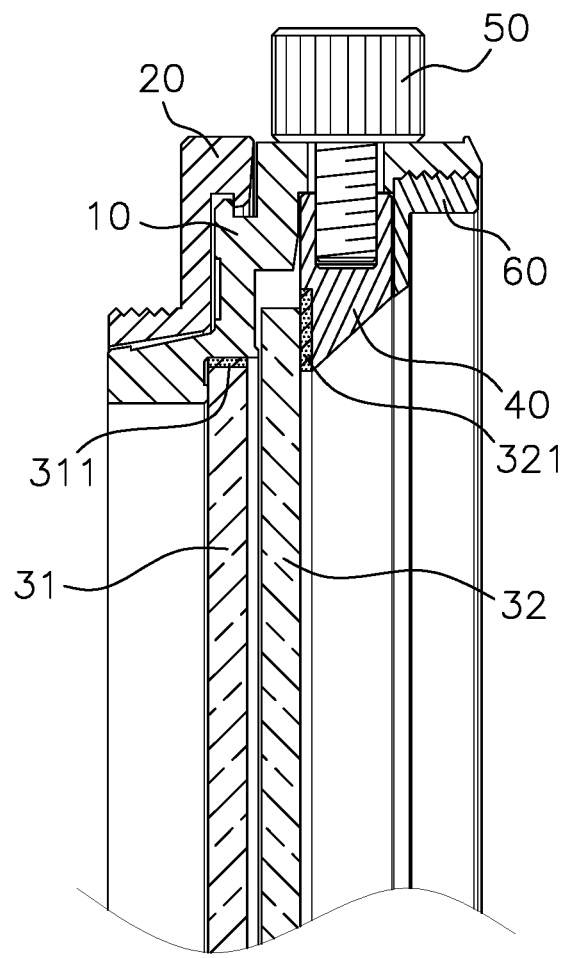
FIG. 1 is a partially enlarged cross-sectional side view of a double-ring lens filter holder in accordance with the present invention.
Figure 2:
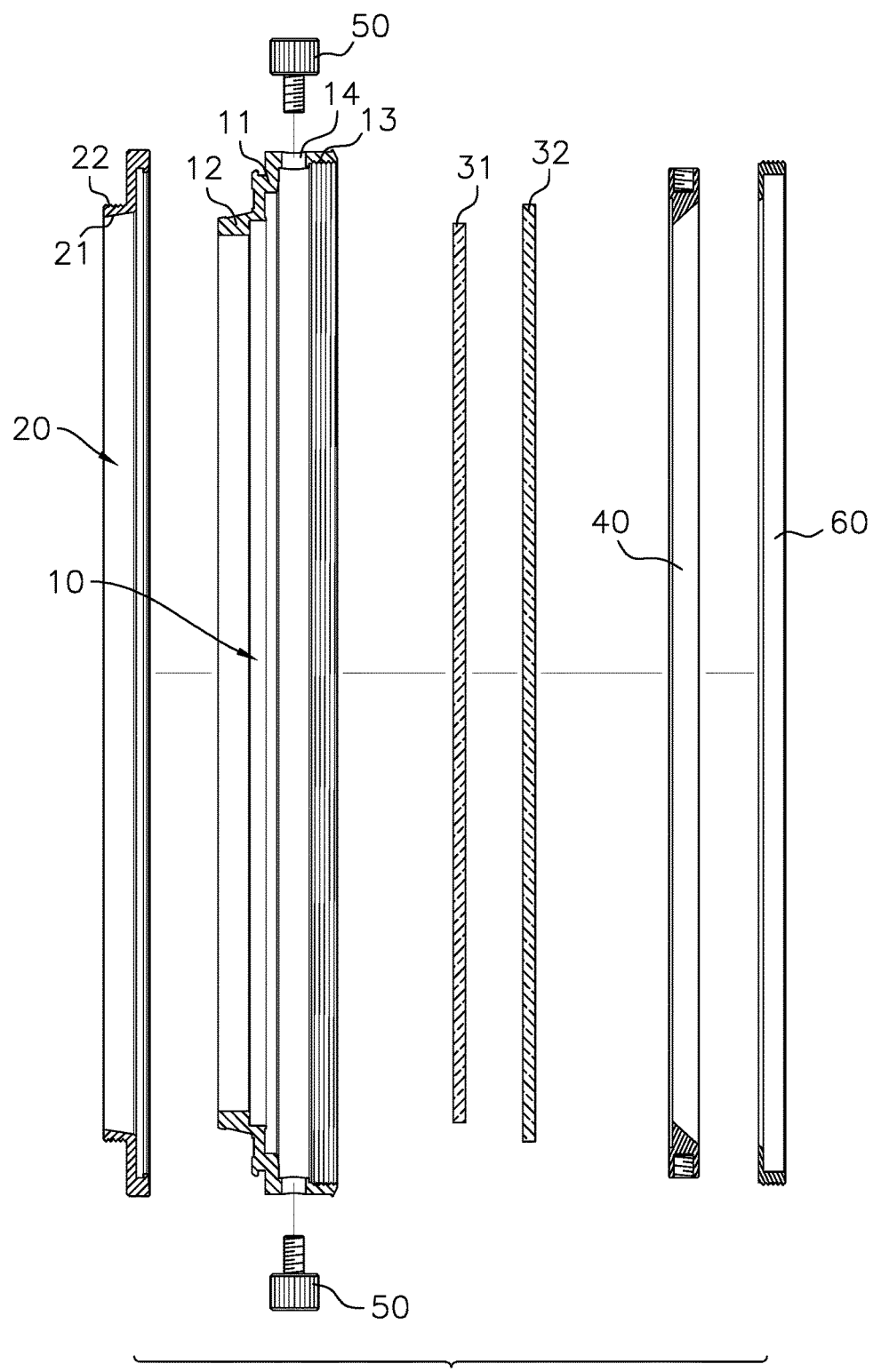
FIG. 2 is an exploded cross-sectional side view of the double-ring lens filter holder in FIG. 1.

With reference to FIGS. 1 and 2, a double-ring lens filter holder in accordance with the present invention comprises a limiting ring 10, a lock ring 20, a fixed filter 31, an adjusting ring 40, a rotary filter 32, at least one guide rod 50, and a compression ring 60.

Figure 3:
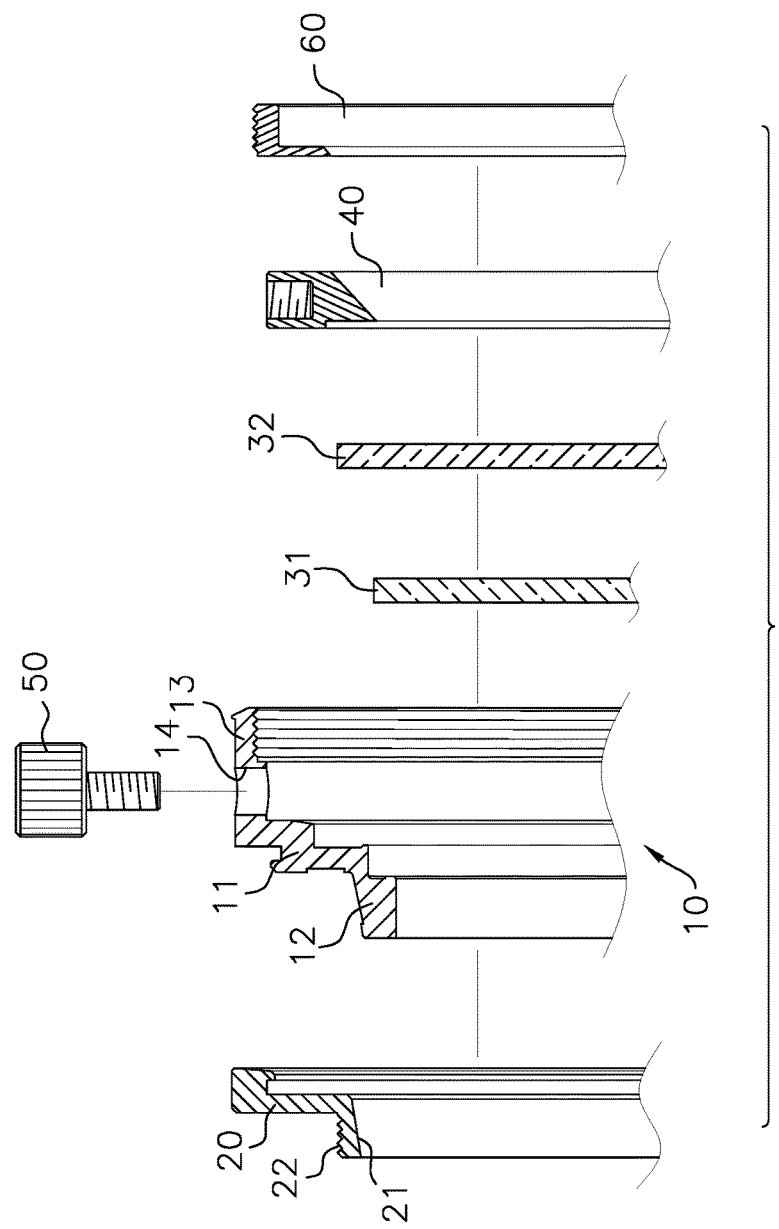
FIG. 3 is an exploded and enlarged cross-sectional side view of the double-ring lens filter holder in FIG. 1.

With reference to FIG. 3, the limiting ring 10 has an inner ring portion 11, a connection ring portion 12, a sleeve ring portion 13, and at least one curved recess 14. The inner ring portion 11 radially extends and has an inner periphery and an outer periphery. The connection ring portion 12 axially extends from the inner periphery of the inner ring portion 11 to a rear side of the limiting ring 10. The sleeve ring portion 13 axially extends from the outer periphery of the inner ring portion 11 to a front side of the limiting ring 10.

Figure 4:
FIG. 4 is a perspective view of a limiting ring in FIG. 1.
Figure 5:
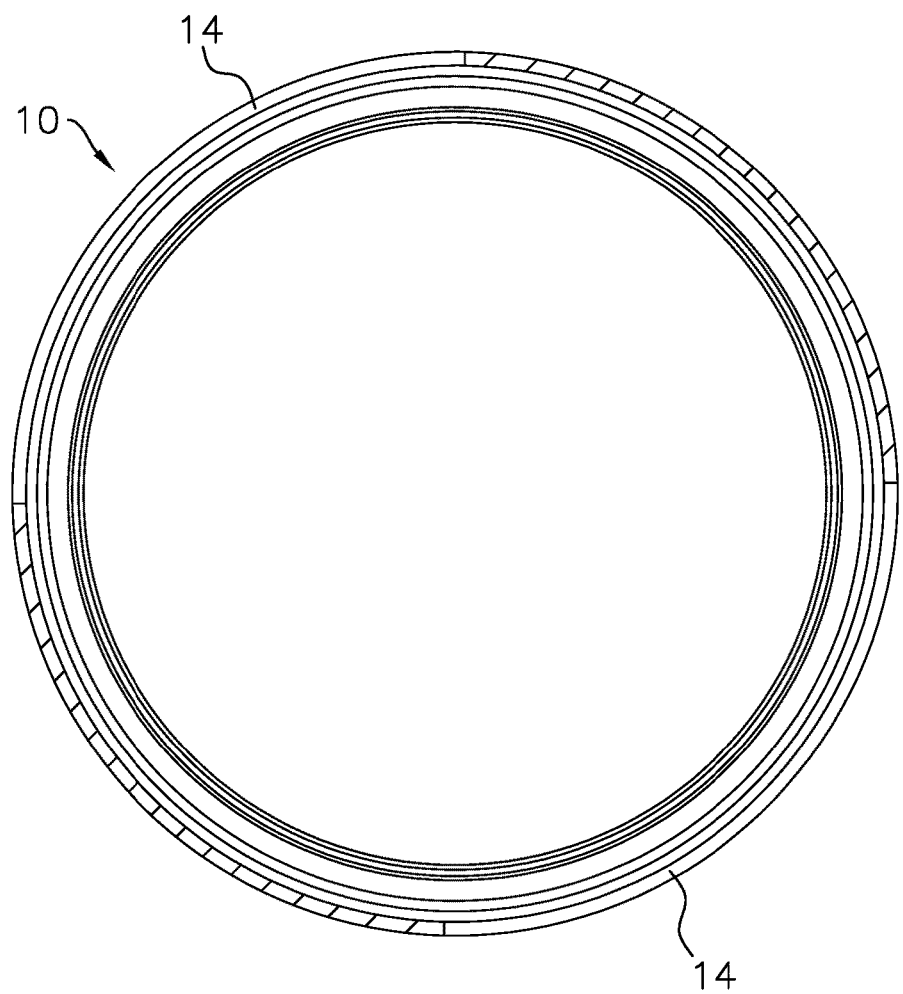
FIG. 5 is a cross-sectional front view of the limiting ring in FIG. 1.

With reference of FIGS. 4 and 5, the at least one curved recess 14 is formed through the sleeve ring portion 13 and annularly extends around a center of the sleeve ring portion 13. In a preferred embodiment, a radian of each curved recess 14 is less than 90 degrees.

The lock ring 20 is mounted around the inner ring portion 11 of the limiting ring 10 and the connection ring portion 12, and engages with the limiting ring 10. The lock ring 20 has a connective ring portion 21. The connective ring portion 21 is formed on and protrudes axially from a rear side of the lock ring 20 and is annularly formed around a periphery of the connection ring portion 12 of the limiting ring 10. The connective ring portion 21 has an outer surface, and an outer threaded portion 22 is annularly formed on the outer surface. The outer threaded portion 22 may engage with an inner threaded portion formed inside a front side of a camera lens for the double-ring lens filter holder to be mounted on the front portion of the camera lens.

The fixed filter 31 is mounted within a space that is surrounded by the inner periphery of the inner ring portion 11, and the fixed filter 31 is mounted securely on the inner periphery of the inner ring portion 11.

The adjusting ring 40 is mounted rotatably within the space that is surrounded by the sleeve ring portion 13 of the limiting ring 10. The adjusting ring 40 has an inner ring surface facing the inner ring portion 11 of the limiting ring 10.

The rotary filter 32 is mounted between the adjusting ring 40 and the inner ring portion 11 of the limiting ring 10 and is mounted securely on the inner ring surface of the adjusting ring 40 so that the rotary filter 32 can rotate together with the adjusting ring 40.

With reference of FIG. 1, in a preferred embodiment, the fixed filter 31 is mounted securely on the inner ring portion 11 of the limiting ring 10 by glue 311, and the rotary filter 32 is also mounted securely on the adjusting ring 40 by glue 321. In another preferred embodiment, an annular washer may be mounted on a periphery of one side of the rotary filter 32, which makes the rotary filter 32 mounted on the inner ring surface of the adjusting ring 40 with the annular washer, clamping the annular washer between the rotary filter 32 and the inner ring surface of the adjusting ring 40. In other words, the rotary filter 32 is mounted securely on the adjusting ring 40 through the annular washer.

Each guide rod 50 is mounted through a respective one of the at least one curved recess 14 and is mounted securely on the adjusting ring 40. By moving the guide rod 50 along the curved recess 14, users can then rotate the adjusting ring 40.

With reference of FIGS. 2, 4 and 5, in a preferred embodiment, a number of the at least one curved recess 14 of the limiting ring 10 is two, and the two curved recesses 14 are formed on the opposite sides of the sleeve ring portion 13, respectively. A number of the at least one guide rod 50 is two and the two guide rods 50 are mounted securely on the adjusting ring 40 through the two curved recesses 14, respectively.

The compression ring 60 is mounted within the space that is surrounded by the sleeve ring portion 13 of the limiting ring 10, and the compression ring 60 detachably engages with the sleeve ring portion 13. The adjusting ring 40 and the rotary filter 32 are clamped and limited between the compression ring 60 and the inner ring portion 11 of the limiting ring 10. Particularly, the compression ring 60 and the sleeve ring portion 13 engage with each other by the thread structure.

When the fixed filter 31 and the rotary filter 32 are both polarizing filters, in addition to moving the guide rod 50 to adjust the polarizing and darkening effects, by limiting the radian of the curved recesses 14 within the range where the cross pattern does not occur, the curved recesses 14 can therefore limit the rotating angle of the guide rod 50, preventing the users from rotating the rotary filter 32 through the guide rod 50 to the position that causes the cross pattern. Moreover, the protruding guide rod 50 allows the users to accurately find the correct position to rotate the rotary filter 32.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A double-ring lens filter holder, comprising:
  a limiting ring having:
    an inner ring portion extending radially;
    a connection ring portion axially extending from an inner periphery of the inner ring portion to a rear side of the limiting ring;
    a sleeve ring portion axially extending from an outer periphery of the inner ring portion to a front side of the limiting ring; and
    at least one curved recess formed through the sleeve ring portion and annularly extending around a center of the sleeve ring portion;
  a lock ring mounted around the inner ring portion and the connection ring portion, and engaging with the limiting ring;
  a fixed filter mounted within a space which is surrounded by the inner periphery of the inner ring portion of the limiting ring, and the fixed filter mounted securely on the inner periphery of the inner ring portion;

an adjusting ring rotatably mounted within a space which is surrounded by the sleeve ring portion of the limiting ring and having
 an inner ring surface facing the inner ring portion of the limiting ring;

a rotary filter mounted between the adjusting ring and the inner ring portion of the limiting ring and mounted securely on the inner ring surface of the adjusting ring;

at least one guide rod mounted through the at least one curved recess and mounted securely on the adjusting ring; and a compression ring mounted within the space which is surrounded by the sleeve ring portion of the limiting ring, and the compression ring detachably engaging with the sleeve ring portion;

wherein the adjusting ring and the rotary filter are clamped and limited between the compression ring and the inner ring portion of the limiting ring.

2. The double-ring lens filter holder as claimed in claim 1, wherein a radian of each one of the at least one curved recess is less than 90 degrees.

3. The double-ring lens filter holder as claimed in claim 2, wherein
 a number of the at least one curved recess is two and the two curved recesses are respectively formed on two opposite sides of the sleeve ring portion;
 a number of the at least one guide rod is two and the two guide rods are respectively mounted through the two curved recesses.

4. The double-ring lens filter holder as claimed in claim 1, wherein
 the fixed filter is mounted securely on the inner ring portion of the limiting ring by glue; and
 the rotary filter is mounted securely on the adjusting ring by glue.

5. The double-ring lens filter holder as claimed in claim 3, wherein
 the fixed filter is mounted securely on the inner ring portion of the limiting ring by glue; and
 the rotary filter is mounted securely on the adjusting ring by glue.

6. The double-ring lens filter holder as claimed in claim 1, wherein
 the lock ring has
  a connective ring portion protruding axially from a rear side of the lock ring and annularly mounted around a periphery of the connection ring portion of the limiting ring; and
  the connective ring portion has an outer threaded portion formed on an outer surface of the connective ring portion.

7. The double-ring lens filter holder as claimed in claim 5, wherein
 the lock ring has
  a connective ring portion protruding axially from a rear side of the lock ring and annularly mounted around a periphery of the connection ring portion of the limiting ring; and
  the connective ring portion has an outer threaded portion formed on an outer surface of the connective ring portion.

8. The double-ring lens filter holder as claimed in claim 1, wherein the fixed filter and the rotary filter are both polarizing filters.

9. The double-ring lens filter holder as claimed in claim 7, wherein the fixed filter and the rotary filter are both polarizing filters.

\* \* \* \* \*